(12) United States Patent
Araujo Da Silva et al.

(10) Patent No.: US 12,122,187 B2
(45) Date of Patent: Oct. 22, 2024

(54) PNEUMATIC TIRE COMPRISING A RUBBER COMPOSITION BASED ON EPOXIDIZED POLYISOPRENE AND A THERMOPLASTIC POLYURETHANE

(71) Applicant: COMPAGNIE GENERALE DES ETABLISSEMENTS MICHELIN, Clermont-Ferrand (FR)

(72) Inventors: Jose-Carlos Araujo Da Silva, Clermont-Ferrand (FR); Cyrille Guery, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 724 days.

(21) Appl. No.: 17/285,712

(22) PCT Filed: Oct. 7, 2019

(86) PCT No.: PCT/FR2019/052368
§ 371 (c)(1),
(2) Date: Apr. 15, 2021

(87) PCT Pub. No.: WO2020/079344
PCT Pub. Date: Apr. 23, 2020

(65) Prior Publication Data
US 2021/0291590 A1 Sep. 23, 2021

(30) Foreign Application Priority Data
Oct. 15, 2018 (FR) .................................. 18/59516

(51) Int. Cl.
*B60C 1/00* (2006.01)
*C08F 8/08* (2006.01)
*C08F 236/08* (2006.01)
*C08K 3/04* (2006.01)
*C08K 3/06* (2006.01)
*C08K 3/22* (2006.01)
*C08K 5/09* (2006.01)
*C08K 5/47* (2006.01)
*C08L 7/00* (2006.01)
*C08L 75/04* (2006.01)

(52) U.S. Cl.
CPC ............. *B60C 1/0016* (2013.01); *C08F 8/08* (2013.01); *C08F 236/08* (2013.01); *C08K 3/04* (2013.01); *C08K 3/06* (2013.01); *C08K 3/22* (2013.01); *C08K 5/09* (2013.01); *C08K 5/47* (2013.01); *C08L 7/00* (2013.01); *C08L 75/04* (2013.01); *B60C 2200/06* (2013.01); *B60C 2200/08* (2013.01); *C08K 2003/2296* (2013.01); *C08L 2312/00* (2013.01)

(58) Field of Classification Search
CPC . B60C 1/00; C08F 8/08; C08F 236/08; C08L 75/04; C08L 7/00; C08K 3/04; C08K 3/06; C08K 3/22; C08K 5/47; C08K 5/09

USPC .......................................................... 523/156
See application file for complete search history.

(56) References Cited

U.S. PATENT DOCUMENTS

| | | |
|---|---|---|
| 3,875,118 A | 4/1975 | Meisert et al. |
| 4,124,572 A | 11/1978 | Mao |
| 4,182,898 A | 1/1980 | Fujiwara et al. |
| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 6,610,261 B1 | 8/2003 | Custodero et al. |
| 6,747,087 B2 | 6/2004 | Custodero et al. |
| 6,975,396 B2 | 12/2005 | Custodero et al. |
| 7,135,517 B2 | 11/2006 | Simonot et al. |
| 7,199,175 B2 | 4/2007 | Vasseur |
| 7,202,295 B2 | 4/2007 | Simonot et al. |
| 7,250,463 B2 | 7/2007 | Durel et al. |
| 7,256,233 B2 | 8/2007 | Simonot et al. |
| 7,425,313 B2 | 9/2008 | Custodero et al. |
| 7,820,771 B2 | 10/2010 | Lapra et al. |
| 7,900,667 B2 | 3/2011 | Vasseur |
| 7,999,036 B2 | 8/2011 | Nishioka et al. |
| 8,461,269 B2 | 6/2013 | Varagniat et al. |
| 8,883,929 B2 | 11/2014 | Gandon-Pain et al. |
| 9,724,968 B2 | 8/2017 | Kitano et al. |
| 11,241,370 B2 | 2/2022 | Valero et al. |
| 2001/0034389 A1 | 10/2001 | Vasseur |
| 2002/0004549 A1 | 1/2002 | Custodero et al. |
| 2003/0202923 A1 | 10/2003 | Custodero et al. |
| 2003/0212185 A1 | 11/2003 | Vasseur |
| 2004/0030017 A1 | 2/2004 | Simonot et al. |
| 2005/0004297 A1 | 1/2005 | Durel et al. |
| 2005/0032965 A1 | 2/2005 | Valero |

(Continued)

FOREIGN PATENT DOCUMENTS

| | | |
|---|---|---|
| CA | 2168938 A1 | 9/1996 |
| CA | 2322093 A1 | 2/2001 |

(Continued)

OTHER PUBLICATIONS

S. Brunauer, et al., "Adsorption of Gases in Multimolecular Layers", J. Am. Chem. Soc., vol. 60, pp. 309-319 (1938).

(Continued)

*Primary Examiner* — Deve V Hall
(74) *Attorney, Agent, or Firm* — VENABLE LLP

(57) ABSTRACT

A tire having improved mechanical properties, comprises a rubber composition based on at least one epoxidized polyisoprene having a molar degree of epoxidation ranging from 5% to 85%, at least one thermoplastic polyurethane, and a crosslinking system.

15 Claims, No Drawings

(56) References Cited

U.S. PATENT DOCUMENTS

| | | |
|---|---|---|
| 2005/0171264 A1 | 8/2005 | Simonot et al. |
| 2005/0267242 A1 | 12/2005 | Custodero et al. |
| 2006/0009564 A1 | 1/2006 | Simonot et al. |
| 2007/0112120 A1 | 5/2007 | Vasseur |
| 2008/0027176 A1 | 1/2008 | Nishioka et al. |
| 2008/0045643 A1 | 2/2008 | Henning et al. |
| 2008/0132644 A1 | 6/2008 | Lapra et al. |
| 2009/0270558 A1 | 10/2009 | Gandon-Pain et al. |
| 2010/0022714 A1 | 1/2010 | Varagniat et al. |
| 2010/0221541 A1 | 9/2010 | Valero et al. |
| 2011/0021702 A1 | 1/2011 | Gandon-Pain et al. |
| 2011/0263784 A1 | 10/2011 | Valero et al. |
| 2012/0208948 A1 | 8/2012 | Gandon-Pain et al. |
| 2013/0096230 A1 | 4/2013 | Abad et al. |
| 2013/0345336 A1 * | 12/2013 | Lopitaux ............ C08L 75/04 523/156 |
| 2014/0076473 A1 | 3/2014 | Abad et al. |
| 2014/0096882 A1 | 4/2014 | Kitano et al. |
| 2014/0190604 A1 | 7/2014 | Custodero et al. |
| 2015/0004413 A1 | 1/2015 | Abad et al. |
| 2017/0190217 A1 * | 7/2017 | Joseph ............ C08L 7/00 |
| 2018/0355152 A1 | 12/2018 | Araujo Da Silva et al. |
| 2021/0292516 A1 | 9/2021 | Guery et al. |

FOREIGN PATENT DOCUMENTS

| | | | | |
|---|---|---|---|---|
| CN | 103732398 A | 4/2014 | | |
| CN | 104093551 A | 10/2014 | | |
| EP | 0501227 A1 | 9/1992 | | |
| EP | 0735088 A1 | 10/1996 | | |
| EP | 0810258 A1 | 12/1997 | | |
| EP | 931809 A2 * | 7/1999 | ............ | C08J 11/12 |
| FR | 2201320 | 4/1974 | | |
| FR | 3060013 A1 | 6/2018 | | |
| JP | 2010-144039 A | 7/2010 | | |
| JP | 5485545 B2 | 5/2014 | | |
| WO | 97/36724 A2 | 10/1997 | | |
| WO | 99/16600 A1 | 4/1999 | | |
| WO | 99/28376 A2 | 6/1999 | | |
| WO | 00/05300 A1 | 2/2000 | | |
| WO | 00/05301 A1 | 2/2000 | | |
| WO | 00/73372 A1 | 12/2000 | | |
| WO | 02/10269 A2 | 2/2002 | | |
| WO | 02/053634 A1 | 7/2002 | | |
| WO | 03/016215 A1 | 2/2003 | | |
| WO | 03/016387 A1 | 2/2003 | | |
| WO | 2004/003067 A1 | 1/2004 | | |
| WO | 2004/056915 A1 | 7/2004 | | |
| WO | 2006/069792 A1 | 7/2006 | | |
| WO | 2006/069793 A1 | 7/2006 | | |
| WO | 2008/003434 A1 | 1/2008 | | |
| WO | 2008/003435 A1 | 1/2008 | | |
| WO | 2013/041151 A1 | 3/2013 | | |
| WO | WO-2015117863 A1 * | 8/2015 | .......... | B60C 1/0016 |
| WO | 2017/097948 A1 | 6/2017 | | |

OTHER PUBLICATIONS

International Search Report dated Jan. 30, 2020, in corresponding PCT/FR2019/052368 (4 pages).

* cited by examiner

PNEUMATIC TIRE COMPRISING A RUBBER COMPOSITION BASED ON EPOXIDIZED POLYISOPRENE AND A THERMOPLASTIC POLYURETHANE

BACKGROUND

The field of the present invention is that of rubber compositions reinforced by a reinforcing filler which can be used in the manufacture of tyres for vehicles.

During running, a tyre tread is subjected to mechanical stresses and to attacks resulting from direct contact with the ground. In the case of a tyre fitted to a vehicle bearing heavy loads, the mechanical stresses and the attacks undergone by the tyre are magnified under the effect of the weight borne by the tyre.

Off-road tyres are subjected to high stresses, both locally: running over the indenting macrobodies represented by the stones from which the tracks are formed (crushed rock), but also globally: high torque transmission during running on slopes, generally of about 10%, and high stresses on the tyres during U-turns for loading and unloading manoeuvres.

The consequence of this is that the initiating cracks which are created in the tread under the effect of these stresses and these attacks have a tendency to propagate further. The propagation of cracks within the tyre can lead to its damage and therefore can reduce its life.

This is particularly true for the tyres equipping civil engineering vehicles which are moving about generally in mines. This is also true for the tyres which are fitted to agricultural vehicles, due to the stony ground surface of arable land. The tyres which equip worksite heavy-duty vehicles, which are moving both on stony ground surfaces and on bituminous ground surfaces, also experience these same attacks. Due to the two aggravating factors, which are the weight borne by the tyre and the aggressive nature of the running ground, the resistance to the initiation of cracks and the good mechanical properties of a tyre for a civil engineering vehicle, an agricultural vehicle or a worksite heavy-duty vehicle prove to be crucial for increasing its life.

It is therefore important to have tyres available for vehicles, in particular those carrying heavy loads, the composition of which has improved mechanical properties with respect to breaking, and good reinforcement.

Furthermore, it remains advantageous for the solutions provided in order to solve this problem not to be disadvantageous to the other properties of the rubber composition, in particular the stiffness and the hysteresis. This is because the use of a hysteretic composition in a tyre may manifest itself by a rise in the internal temperature of the tyre, which may also result in a reduction in the durability of the tyre.

SUMMARY

In the light of the above, it is an ongoing objective to provide rubber compositions which have good mechanical properties, without being disadvantageous to the reinforcement, or even while improving it.

Continuing its research, the applicant has discovered that the combination of a specific elastomeric matrix and the addition of thermoplastic polyurethane to a rubber composition for tyres makes it possible to solve the aforementioned technical problem.

Thus, a subject of the present invention is a tyre which comprises a rubber composition based on at least one epoxidized polyisoprene having a molar degree of epoxidation ranging from 5% to 85%, at least one thermoplastic polyurethane, and a crosslinking system.

DETAILED DESCRIPTION

I—Definitions

The expression "composition based on" should be understood as meaning a composition comprising the mixture and/or the product of the in situ reaction of the various constituents used, some of these constituents being able to react and/or being Intended to react with one another, at least partially, during the various phases of manufacture of the composition; it thus being possible for the composition to be in the completely or partially crosslinked state or in the noncrosslinked state.

The expression "part by weight per hundred parts by weight of elastomer" (or phr) should be understood as meaning, for the purposes of the present invention, the part by weight per hundred parts by weight of elastomers, whether or not they are thermoplastic. In other words, for the purposes of the present invention, the thermoplastic polyurethanes are considered to be elastomers.

In the present document, unless expressly indicated otherwise, all the percentages (%) indicated are percentages (%) by weight.

Furthermore, any interval of values denoted by the expression "between a and b" represents the range of values extending from more than "a" to less than "b" (i.e. limits a and b excluded), while any interval of values denoted by the expression "from a to b" means the range of values extending from "a" up to "b" (i.e. including the strict limits a and b). In the present document, when an interval of values is described by the expression "from a to b", the interval represented by the expression "between a and b" is also and preferably described.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. Preferably, the term "predominant" is understood to mean present at more than 50%, preferably more than 60%, 70%, 80%, 90%, and more preferentially the "predominant" compound represents 100%.

The compounds comprising carbon mentioned in the description can be of fossil origin or biosourced. In the latter case, they may be partially or completely derived from biomass or may be obtained from renewable starting materials derived from biomass. Polymers, plasticizers, fillers, etc., are concerned in particular.

II—Description of the Invention

II-1 Epoxidized Polyisoprene

The composition of the tyre according to the invention has the essential characteristic of comprising at least one epoxidized polyisoprene having a molar degree of epoxidation ranging from 5% to 85%.

In the present document, the term "polyisoprene" Is intended to mean a polyisoprene which is not epoxidized. The polyisoprene can be natural rubber, a synthetic polyisoprene having a molar content of cis-1,4 bonds of at least 90%, or a mixture thereof.

The term "epoxidized polyisoprene" is intended to mean a polyisoprene which has undergone an epoxidation step. The epoxidized polyisoprene can be an epoxidized natural rubber, an epoxidized synthetic polyisoprene having a molar content of cis-1,4 bonds of at least 90% before epoxidation, or a mixture thereof.

The epoxidized polyisoprene used in the context of the present invention is an elastomer and is not to be confused with an epoxidized polyisoprene of low molar mass, generally used as plasticizer, which is not an elastomer due to its low molar mass. An epoxidized polyisoprene, as elastomer, generally has a high Mooney viscosity in the raw state. The Mooney viscosity (ML 1+4) at 100° C. of the epoxidized polyisoprene used in the context of the present invention is greater preferably than 20, more preferably than 30 and more preferably still than 40. It is also generally less than or equal to 150. As an indication, the Mooney viscosities (ML 1+4) at 100° C. of the epoxidized polyisoprenes are preferentially from 30 to 150, more preferentially from 40 to 150, even more preferentially from 50 to 140.

The Mooney viscosity is measured using an oscillating consistometer as described in Standard ASTM 01646 (1999). The measurement is carried out according to the following principle: the sample, analysed in the raw state (i.e., before curing), is moulded (shaped) in a cylindrical chamber heated to a given temperature (for example 100° C.). After preheating for 1 minute, the rotor rotates within the test specimen at 2 revolutions/minute and the working torque for maintaining this movement is measured after rotating for 4 minutes. The Mooney viscosity (ML 1+4) is expressed in "Mooney unit" (MU, with 1 MU=0.83 newton.metre).

Thus, according to the invention, the at least one epoxidized polyisoprene, having a molar degree of epoxidation ranging from 5% to 85%, advantageously has a Mooney viscosity (ML 1+4) at 100° C., measured according to Standard ASTM D1646 (1999), within a range extending from 30 to 150, preferably from 40 to 150, more preferably from 50 to 140.

The epoxidized polyisoprene, whether it is an epoxidized natural rubber or an epoxidized synthetic polyisoprene, can be obtained in a known way by epoxidation of polyisoprene, for example by processes based on chlorohydrin or bromohydrin or processes based on hydrogen peroxides, alkyl hydroperoxides or peracids (such as peracetic acid or performic acid). Epoxidized polyisoprenes are commercially available. The molar degree of epoxidation, which is Information provided by the suppliers, corresponds to the ratio of the number of epoxidized moles of isoprene unit to the number of moles of isoprene unit in the polyisoprene before epoxidation.

As examples of commercially available epoxidized polyisoprenes, mention may be made of Epoxyprene 25 and Epoxyprene 50 from the company Guthrie or Ekoprena 25 and Ekoprena 50 from the company Felda.

According to the present invention, the expression "at least one epoxidized polyisoprene" should be understood as one or more epoxidized polyisoprenes which can differ in terms of either their microstructure, their macrostructure or their degree of epoxidation. In the case where the polyisoprene comprises several epoxidized polyisoprenes, the reference to the amount of epoxidized polyisoprene of the polyisoprene applies to the total weight of the epoxidized polyisoprenes of the polyisoprene. For example, the characteristic according to which the epoxidized polyisoprene is present in the rubber composition at a content of greater than 50 phr means that, in the case of a mixture of epoxidized polyisoprenes, the total weight of epoxidized polyisoprenes is greater than 50 phr.

In the case where the epoxidized polyisoprene is a mixture of epoxidized polyisoprenes which can differ from one another in their molar degree of epoxidation, the reference to a molar degree of epoxidation, whether preferential or not, applies to each of the epoxidized polyisoprenes of the mixture.

According to the invention, the molar degree of epoxidation of the at least one epoxidized polyisoprene having a molar degree of epoxidation ranging from 5% to 85% can be within a range extending from 10% to less than 80%, preferably from 15% to 75%. Advantageously, the molar degree of epoxidation of the at least one epoxidized polyisoprene having a molar degree of epoxidation ranging from 5% to 85% can be within a range extending from 40% to 80%, preferably from 45% to 75%. This degree of epoxidation is particularly advantageous for improving the reinforcement of the rubber composition. Alternatively, the molar degree of epoxidation of the at least one epoxidized polyisoprene having a molar degree of epoxidation ranging from 5% to 85% can be within a range extending from 10% to less than 50%, preferably from 15% to less than 40%.

The content of epoxidized polyisoprene having a molar degree of epoxidation ranging from 5% to 85%, in the rubber composition of the tyre according to the invention, is advantageously within a range extending from 20 to 90 phr, preferably from 30 to 80 phr, more preferably from 35 to 70 phr.

Optionally, the rubber composition of the tyre according to the invention can comprise another elastomer, preferentially a diene elastomer.

The term "other elastomer" is understood to mean an elastomer other than epoxidized polyisoprene having a molar degree of epoxidation ranging from 5% to 85%. Advantageously, the other elastomer is not epoxidized.

The term "diene" elastomer (or, without distinction, rubber), whether natural or synthetic, should be understood, in a known way, as meaning an elastomer consisting, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". The term "essentially unsaturated" is generally understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin).

The expression "diene elastomer that can be used in the compositions in accordance with the invention" is understood particularly to mean:
  a) any homopolymer of a conjugated or non-conjugated diene monomer having from 4 to 18 carbon atoms,
  b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

Preferentially, the other diene elastomer is a diene elastomer selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Particularly advantageously, when another elastomer Is present In the composition of the tyre according to the invention, it is an isoprene elastomer other than epoxidized polyisoprene having a molar degree of epoxidation ranging from 5% to 85%. It may be, for example, an epoxidized polyisoprene having a molar degree of epoxidation of less than 5%, or greater than 85%, or a non-epoxidized isoprene elastomer, or else a mixture thereof.

The term "isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers. Mention will in particular be made, among isoprene copolymers, of isobutene/isoprene (butyl rubber-IIR), isoprene/styrene (SIR), isoprene/butadiene (SIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferentially still of greater than 98%.

Advantageously, the other elastomer is an isoprene elastomer, preferably made of natural rubber or a synthetic, non-epoxidized polyisoprene.

The content of the other elastomer in the composition of the tyre according to the invention is preferentially within a range extending from 0 to 20 phr and preferably from 0 to 10 phr.

II-2 Thermoplastic Polyurethane

The composition of the tyre according to the invention has the essential characteristic of comprising a thermoplastic polyurethane (TPU), which can be any thermoplastic polyurethane, well known to those skilled in the conventional art.

The TPUs that can be used in the context of the present invention advantageously comprise at least one flexible segment and at least one rigid segment. Advantageously, they are block copolymers alternating rigid segments and flexible segments. The rigid segments can in particular be obtained from the reaction of a polyisocyanate (generally a diisocyanate) with a diol or a triol of low molecular weight (preferably within a range extending from 40 to 350 g/mol), called chain extender. By way of example of a low molecular weight diol, mention may be made, without being limited to these examples, of ethylene glycol, diethylene glycol, propanediol, butanediol, hexanediol, isosorbide, I 'hydroquinone, etc. By way of example of a low molecular weight triol, mention may be made, without being limited to these examples, of trimethylol propane, glycerol, etc. Moreover, the polyisocyanate can be aromatic, such as MD1 (methylene diphenyl diisocyanate), toluene diisocyanate (TDI) or phenylene diisocyanate (PPDI), aliphatic, such as hexamethylene diisocyanate (HDI) or isoprene diisocyanate (IPDI), alicyclic, such as H12 MDI (4,4-dicyclohexylmethane diisocyanate), or combinations thereof. The flexible segments can in particular result from the reaction of a polyisocyanate with a polyol comprising a long hydrocarbon-based chain (the molecular weight of the hydrocarbon-based chain of the polyisocyanate is generally between 600 and 2500 g/mol). The polyol can be of the ether or ester type (generally a polyester glycol or a polyether glycol), but also of the polycarbonate type. For example, for the polyesters, mention may be made of polyadipates or polycaprolactones, for the polyethers: polypropylene glycols and polytetramethylene glycols, and for the polycarbonates: polycarbonate diols. The flexible block of the polyurethane can also be partially crosslinked, for example with a hyperbranched or dendritic polyol.

TPUs exhibit both elastomeric and thermoplastic properties. They exhibit, in a well-known manner, a Tg peak (flexible segments of the TPU) and a melting point peak (rigid segments of the TPU) (Mp, measured in a well-known manner by DSC according to Standard ASTM D3418). Thus, the flexible segments of the TPUs are generally defined by a Tg which can be less than or equal to ambient temperature (25° C.), while the rigid segments can have Mp greater than or equal to 80° C.

In the present patent application, when reference is made to the glass transition temperature of a TPU, it Is the glass transition temperature relating to the flexible segment (unless otherwise indicated).

By way of examples of TPUs that can be used in the context of the present invention, mention may be made of those described in document FR 2 201320, US 4 124 S72, U.S. Pat. No. 4,182,898, US 2003/0032754, CA 2 322 093 or CA 2 168 938 for example.

According to the invention, the at least one thermoplastic polyurethane advantageously has an elongation at break greater than 500% and a modulus at break greater than 30 MPa, measured according to Standard DIN53504. More preferentially, the at least one thermoplastic polyurethane has an elongation at break greater than 600% and 35 MPa, measured according to Standard DIN 53504.

Advantageously, the at least one thermoplastic polyurethane has a Shore A hardness, measured according to the standard according to DIN 53505, ranging from 60 to 100, preferably from 70 to 90.

Moreover, the at least one thermoplastic polyurethane advantageously has a viscosity at 170° C., measured according to the method described below, ranging from 1000 to 10 000 Pa·s, preferably from 1500 to 8500 Pa·s, more preferably from 2500 to 7500 Pa·s.

The method for measuring the viscosity uses an RPA 2000LV rheology device (oscillating disc rheometer) equipped with the standard 200 in·lbs (22.6 Nm) viscosity sensor. The RPA device makes it possible to stress in torsion a sample of material enclosed in a chamber having biconical walls. In order to carry out the measurement, a sample of material having a diameter of approximately 30 mm and a weight of approximately 5 g is deposited in the chamber of the RPA (A total volume of 8 cm$^3$ is regarded as optimal; the amount is sufficient when a small amount of sample escapes from each side of the chamber and is visible at the end of the test). Preferably, the material is cut out beforehand from a sheet of this material. In the case where this sheet of material is insufficiently thick, it is possible to stack the sections of this sheet of material. Firstly, a shaping operation is carried out by applying, to the sample enclosed in the chamber, a temperature of 180° C. for 5 min with a shearing of 2.78% (i.e., an angle of 0.19°). At the end of this operation, the sample is completely moulded in the closed chamber of the RPA. The sample is subsequently cooled to 130° C. directly in the chamber of the RPA. It is then possible to start the measurement of the viscosity value at 500% of alternating dynamic shear (i.e. an angle of 36°) and 0.1 Hz in a temperature range varying from 130 to 200° C. A curve of variation in viscosity $\eta^*$ as a function of the temperature is obtained, on which the viscosities $\eta^*$ of the composition can be extracted at 170° C. The shaping and measuring steps are carried out without intervention, by programming the RPA machine.

By way of examples of commercially available TPUs, mention may be made of Desopam® 3378A sold by the company Bayer, Irogran® A85C 4957 from the company Huntsman, Elastollan® 1175AW from the company BASF, or Pearlthane® 11T80 from the company Lubrizol.

The content of thermoplastic polyurethane in the composition of the tyre according to the invention is advantageously within a range extending from 10 to 80 phr, preferably from 20 to 70 phr, more preferably from 30 to 65 phr.

II-3 Crosslinking System

The crosslinking system can be any type of system known to those skilled in the art in the field of rubber compositions for tyres. It can in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur and/or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferred content of between 0.5 and 12 phr, in particular between 1 and 10 phr. The vulcanization accelerator is used at a preferential content of between 0.5 and 10 phr, more preferentially of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to MBTS), N-cyclohexyl-2-benzothiazole-sulfenamide (CBS), N,N-dicyclohexyl-2-benzothiazole-sulfenamide (DCBS), N-(tert-butyl)-2-benzothiazole-sulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

II-4 Reinforcing Filler

The composition of the tyre according to the invention does not require a reinforcing filler, which is one of its advantages since this makes it possible to greatly reduce the hysteresis of the composition, and thus the rolling resistance of the tyre.

Thus, preferably, the composition of the tyre according to the invention does not comprise a reinforcing filler or comprises less than 150 phr thereof.

The composition of the tyre can comprise from 5 to 150 phr, preferably from 10 to 80 phr, preferably from 15 to 60 phr, preferably from 20 to 55 phr, of reinforcing filler, known for its capacity to reinforce a rubber composition that can be used for the manufacture of tyres.

Advantageously, the composition of the tyre according to the invention does not comprise any reinforcing filler or comprises less than 30 phr thereof, preferably less than 25 phr, preferably less than 20 phr, preferably less than 15 phr, preferably less than 10 phr, preferably less than 5 phr.

The reinforcing filler can be an organic filler such as carbon black, an inorganic filler such as silica or else a mixture of these two types of fillers.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks could, for example, already be incorporated into the diene elastomer, in particular isoprene elastomer, in the form of a masterbatch (see for example applications WO 97/36724-A2 or WO 99/16600-A1).

Mention may be made, as an example of organic fillers other than carbon blacks, of functionalized polyvinyl organic fillers, such as described in applications WO2006/069792-A1, WO2006/069793-A1, WO2008/003434-A1 and WO2008/003435-A1. The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of tyres. In a known manner, certain reinforcing inorganic fillers can be characterized in particular by the presence of hydroxyl groups (—OH) on their surface.

Mineral fillers of the siliceous type, preferentially silica (SiO$_2$), or of the aluminous type, in particular alumina (Al$_2$O$_3$), are suitable in particular as reinforcing inorganic fillers. The silica used can be any reinforcing silica known to those skilled in the art, in particular any precipitated or fumed silica exhibiting a BET specific surface and a CTAB specific surface both of less than 450 m$^2$/g, preferably within a range extending from 30 to 400 m$^2$/g, in particular from 60 to 300 m$^2$/g.

For inorganic fillers such as silica for example, the BET specific surface area of the inorganic filler is determined by gas adsorption using the Brunauer-Emmett-Teller method described in "The Journal of the American Chemical Society", (Vol. 60, page 309, February 1938), and more specifically according to a method derived from Standard NF ISO 5794-1, appendix E, of June 2010 [multipoint (5 point) volumetric method—gas:nitrogen—degassing under vacuum: one hour at 160° C.—relative pressure range p/po: 0.05 to 0.17]. Moreover, the CTAB specific surface area values were determined according to Standard NF ISO 5794-1, appendix G of June 2010. The process is based on the adsorption of CTAB (N-hexadecyl-N,N,N-trimethylammonium bromide) onto the "outer" surface of the reinforcing filler.

Any type of precipitated silica can be used, in particular highly dispersible precipitated silicas (termed "HDS" for "highly dispersible" or "highly dispersible silica"). These precipitated silicas, which may or may not be highly dispersible, are well known to those skilled in the art. Mention may be made, for example, of the silicas described in applications WO 03/016215-A1 and WO 03/016387-A1. Among the commercial HDS silicas, it is possible in particular to use the silicas "Ultrasil® S000GR", "Ultrasil® 7000GR" from Evonik, the silicas "Zeosil® 1085GR", "Zeosil® 1115 MP", "Zeosil® 1165MP", "Zeosil® Premium 200MP", "Zeosil HRS 1200 MP" from Solvay. As non-HOS silica, the following commercial silicas can be used: the silicas "Ultrasil® VN2GR", "Ultrasil® VN3GR" from Evonik, the silica "Zeosil® 175GR" from Solvay, the silicas "Hi-Sil EZ120G(-D)", "Hi-Sil EZ160G(-D)", "Hi-Sil EZ200G(-D)", "Hi-Sil 243LD", "Hi-Sil 210", "Hi-Sil HDP 320G" from PPG.

As other examples of inorganic fillers that can be used in the rubber compositions of the invention, mention may also be made of mineral fillers of the aluminous type, in particular alumina ($Al_2O_3$), aluminium oxides, aluminium hydroxides, aluminosilicates, titanium oxides, silicon carbides or nitrides, all of the reinforcing type as described for example in applications WO 99/28376-A2, WO 00/73372-A1, WO 02/053634-A1, WO2004/003067-A1, WO2004/056915-A2, US6610261-81 and US6747087-B2. Mention may in particular be made of the aluminas "Baikalox A125" or "CR125" (Baikowskl company), "APA-100RDX" (Condéa), "Aluminoxid C" (Evonik) or "AKP-G015" (Sumitomo Chemicals).

The physical state in which the reinforcing inorganic filler is provided is not important, whether it is in the form of a powder, of microbeads, of granules, or else of beads or any other appropriate densified form. Of course, reinforcing inorganic filler is also understood to mean mixtures of different reinforcing inorganic fillers, in particular of silicas as described above.

Those skilled in the art will understand that, instead of the reinforcing Inorganic filler described above, a reinforcing filler of another nature could be used, as long as this reinforcing filler of another nature is covered with an inorganic layer such as silica, or else would comprise functional sites, in particular hydroxyls, at its surface, requiring the use of a coupling agent to establish the bond between this reinforcing filler and the diene elastomer. By way of example, mention may be made of carbon blacks partially or fully covered with silica, or carbon blacks modified with silica, such as, without limitation, the fillers of the "Ecoblack®" type of the "CRX2000" series or of the "CRX4000" series from Cabot Corporation.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler and a second functional group comprising a sulfur atom, said second functional group being able to interact with the diene elastomer.

Preferably, the organosilanes are selected from the group consisting of organosilane polysulfides (symmetrical or asymmetrical) such as bis(3-triethoxysilylpropyl) tetrasulfide, abbreviated to TESPT sold under the name "Si69" by Evonik or bis(triethoxysilylpropyl)disulfide, abbreviated to TESPD sold under the name "Si75" by Evonik, polyorganosiloxanes, mercaptosilanes, blocked mercaptosilanes, such as S-(3-(triethoxysilyl)propyl) octanethioate sold by Momentive under the name "NXT Silane". More preferentially, the organosilane is an organosilane polysulfide.

Of course, use might also be made of mixtures of the coupling agents described above.

When an inorganic filler is used, the content of coupling agent in the composition of the tyre according to the invention is advantageously less than or equal to 10 phr, it being understood that it is generally desirable to use as little as possible thereof. Typically, the content of coupling agent represents from 0.5% to 15% by weight, with respect to the amount of reinforcing inorganic filler. Its content is preferably within a range extending from 0.5 to 7.5 phr, more preferentially within a range extending from 3 to 3 phr. This content is easily adjusted by those skilled in the art according to the content of reinforcing inorganic filler used in the composition of the invention.

Preferably, the reinforcing filler of the rubber composition of the tyre according to the invention comprises a carbon black, a silica or a mixture thereof. Even more preferentially, the reinforcing filler comprises predominantly, preferably exclusively, carbon black.

II-5 Other Possible Additives

The rubber compositions of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

II-6 Tyres

A subject of the present invention is also a finished or semi-finished rubber article, as well as a tyre, comprising a composition according to the present Invention.

The invention relates in particular to tyres intended to equip motor vehicles of passenger vehicle type, SUVs ("Sport Utility Vehicles"), or two-wheel vehicles (notably motorcycles), or aircraft, or else industrial vehicles selected from vans, heavy-duty vehicles . . . , i.e. underground trains, buses, heavy road transport vehicles (lorries, tractors, trailers) or off-road vehicles, such as heavy agricultural vehicles or civil engineering vehicles . . . , and the like.

It is possible to define, within the tyre, three types of regions:

The radially exterior region in contact with the ambient air, this region essentially consisting of the tread and of the outer sidewall of the tyre. An outer sidewall is an elastomeric layer positioned outside the carcass reinforcement relative to the inner cavity of the tyre, between the crown and the bead, so as to completely or partially cover the region of the carcass reinforcement extending from the crown to the bead.

The radially interior region in contact with the Inflation gas, this region generally being composed of the layer airtight to the inflation gases, sometimes known as interior airtight layer or inner liner.

The internal region of the tyre, that is to say that between the exterior and interior regions. This region includes layers or plies which are referred to here as internal layers of the tyre. These are, for example, carcass plies, tread sublayers, tyre belt plies or any other layer which is not in contact with the ambient air or the inflation gas of the tyre.

The tread, the tread surface of which is provided with a tread pattern formed by a plurality of grooves delimiting elements in relief (tread blocks, ribs) so as to generate edge corners of material and also voids. These grooves represent a volume of voids which, with respect to the total volume of the tread (including both the volume of elements in relief and that of all the grooves), is expressed by a percentage denoted, in the present document, by "volumetric void ratio". A volumetric void ratio equal to zero indicates a tread without grooves or voids.

The present invention is particularly well suited to tyres intended for civil engineering or agricultural vehicles and for heavy-duty vehicles, more particularly for civil engineering or agricultural vehicles, the tyres of which are subjected to highly specific stresses, in particular the stony ground surfaces on which they run. Thus, advantageously, the tyre according to the invention is a tyre for civil engineering, agricultural or heavy-duty vehicles, preferably civil engineering vehicles.

The composition defined in the present description is particularly well suited to tyre treads, in particular for a tyre for a vehicle intended to bear heavy loads, in particular from the point of view of the durability of the tyre. Thus, advantageously, the composition of the tyre according to the invention is present in the tread of the tyre.

The tread of the tyre according to the invention may have one or more grooves, the mean depth of which ranges from 15 to 120 mm, preferably 65 to 120 mm.

The tyres according to the invention can have a diameter ranging from 20 to 63 inches, preferably from 35 to 63 inches.

Moreover, the mean volumetric void ratio over the whole of the tread of the tyre according to the invention can be within a range extending from 5% to 40%, preferably from 5% to 25%.

The composition defined in the present description is also well suited to the internal layers. Thus, the composition of the tyre according to the invention is present in at least one internal layer of the tyre. The internal layer can be selected from the group consisting of carcass plies, crown plies, bead-wire fillings, crown feet, decoupling layers, edge rubbers, padding rubbers, the tread underlayer and the combinations of these internal layers. Preferably, the internal layer is selected from the group consisting of carcass plies, crown plies, bead-wire fillings, crown feet, decoupling layers and combinations of these internal layers.

The invention relates to the tyres and semi-finished products for tyres described above, articles made of rubber, both in the raw state (that is to say, before curing) and in the cured state (that is to say, after crosslinking or vulcanization).

II-7 Preparation of the Rubber Compositions

The rubber composition in accordance with the invention is manufactured in appropriate mixers using two successive preparation phases well known to those skilled in the art:

a first phase of thermomechanical working or kneading ("non-productive" phase), which can be carried out in a single thermomechanical step during which all the necessary constituents, in particular the elastomeric matrix, the optional fillers and the optional other various additives, with the exception of the crosslinking system, are introduced Into an appropriate mixer, such as a standard internal mixer (for example of 'Banbury' type). The incorporation of the optional filler into the elastomer may be performed in one or more portions while thermomechanically kneading. The non-productive phase can be carried out at high temperature, up to a maximum temperature of between 110° C. and 200° C., preferably between 130° C. and 185° C., for a period of time generally of between 2 and 10 minutes.

a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

Such phases have been described, for example, in patent applications EP-A-0501227, EP-A-0735088, EP-A-0810258, WO 00/05300 or WO 00/05301.

The final composition thus obtained is subsequently calendered, for example in the form of a sheet or of a plaque, in particular fora laboratory characterization, or also extruded in the form of a rubber semi-finished (or profiled) element which can be used, for example, as a tyre tread for a civil engineering vehicle. These products can subsequently be used for the manufacture of tyres, according to techniques known to those skilled in the art.

The composition may be either in the raw state (before crosslinking or vulcanization) or in the cured state (after crosslinking or vulcanization), may be a semi-finished product which can be used in a tyre.

The crosslinking of the composition can be carried out in a way known to those skilled in the art, for example at a temperature of between 130° C. and 200° C., under pressure.

III—Examples

III-1 Measurements and Tests Used
Dynamic Properties (after Curing): Tensile Test These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the true secant modulus measured in first elongation, calculated by normalizing to the true cross section of the test specimen at any moment of the test. The nominal secant moduli (or apparent stresses, in MPa) are measured in first elongation at 50%, 100% and 300% elongation, respectively denoted M50, M100 and M300. The MSV300/MSV100 ratio is an indicator of the reinforcement of the rubber composition. The high this ratio, the stronger the reinforcement of the composition.

The elongation at break (EB %) and breaking stress (BS) tests are based on Standard NF ISO 37 of December 2005 on an H2 dumbbell specimen and are measured at a tensile speed of 500 mm/min. The elongation at break is expressed as a percentage of elongation. The breaking stress is expressed in MPa.

All these tensile measurements are carried out under the standard conditions of temperature (23±2° C.) and hygrometry (50±5% relative humidity), according to French Standard NF T40-101 (December 1979).

The dynamic properties G*(25%) are measured on a viscosity analyser (Metravib VA4000) according to Standard ASTM D 5992-96. The response of a sample of crosslinked composition (cylindrical test specimen with a thickness of 4 mm and a cross section of 400 mm²), subjected to a simple alternating sinusoidal shear stress, at a frequency of 10 Hz, under the defined conditions of temperature, for example at 60° C., according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G*. For the return cycle, the complex dynamic shear modulus G* at 25% strain, at 60° C., is shown.

III-2 Preparation of the Compositions

The tests which follow are carried out in the following way: the thermoplastic polyurethane then the elastomer and also the various other ingredients, with the exception of the crosslinking system, are successively introduced into a blade mixer (final degree of filling: approximately 70% by volume), the initial vessel temperature of which is approximately 175° C. Thermomechanical working (non-productive phase) is then carried out in one step, which lasts in total approximately from 5 to 8 min, until a maximum "dropping" temperature of 175® C. is reached.

The mixture thus obtained is recovered and cooled and then the crosslinking system is incorporated on a mixer (homofinisher) at 23° C. or 50° C., respectively, everything being mixed (productive phase) in a roll mill for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

The samples thus produced were cured for 20 minutes at 170° C. in a bell press. The samples were analysed after having been cooled at ambient temperature for 24 hours.

III-3 Tests on Rubber Compositions

The examples presented in Table 1 are intended to compare the mechanical properties and the reinforcement of compositions in accordance with the invention (C1, C2, C3 and C4) with those of control compositions (T1, 12 and 13) which differ from the compositions in accordance with the invention in that they do not comprise epoxidized polyisoprene and thermoplastic polyurethane concomitantly. The control compositions 14 and 15 differ from the compositions in accordance with the invention C2 and C3 respectively in that the natural rubber is not epoxidized. The formulations (in phr) and the properties thereof have been summarized in Table 1 below.

TABLE 1

|  | T1 | T2 | T3 | C1 | T4 | C2 | C3 | T5 | C4 |
|---|---|---|---|---|---|---|---|---|---|
| NR (1) | 100 | — | — | — | 60 | — | — | 40 | — |
| ENR50 (2) | — | 100 | — | 60 | — | 40 | — | 80 |
| ENR25 (3) | — | — | — | — | — | 60 | — | — | — |
| TPU (4) | — | — | 100 | 40 | 40 | 40 | 60 | 60 | 20 |
| Sulfur | 1.5 | 1.5 | 1.5 | 1.5 | 1.5 | 1.5 | 1.5 | 1.5 | 1.5 |
| CBS (5) | 1 | 1 | 1 | 1 | 1 | 1 | 1 | 1 | 1 |
| ZnO (6) | 2.5 | 2.5 | 2.5 | 2.5 | 2.5 | 2.5 | 2.5 | 2.5 | 2.5 |
| Stearic acid (7) | 1 | 1 | 1 | 1 | 1 | 1 | 1 | 1 | 1 |
| MSV 300/100 | 100 | 95 | 93 | 127 | 118 | 99 | 135 | 101 | 103 |
| MSV rupture | 100 | 48 | 1376 | 1345 | 365 | 555 | 680 | 418 | 148 |
| % EB | 100 | 79 | 145 | 174 | 113 | 174 | 142 | 113 | 109 |

(1) Natural rubber
(2) Epoxidized natural rubber at 50 mol % (Epoxyprene 50 from the company Guthrie)
(3) Epoxidized natural rubber at 25 mol % (Epoxyprene 25 from the company Guthrie)
(4) Thermoplastic polyurethane (Desmopan 3378A from the company Bayer)
(5) N-Cyclohexyl-2-benzothiazolesulfenamide (Santocure CBS from Flexsys)
(6) Zinc oxide (industrial grade - Umicore)
(7) Stearin (Pristerene 4931 from Uniqema)

These results show that the compositions in accordance with the invention all make it possible to improve the compromise in mechanical properties without penalizing the reinforcement of the composition. The use of an epoxidized polyisoprene having a molar degree of epoxidation of 50% also makes it possible to improve the reinforcement of the composition. Finally, it is observed that the performance compromise is greatly improved when an epoxidized polyisoprene is used instead of a non-epoxidized polyisoprene.

The invention claimed is:

1. A tire comprising a rubber composition based on:
   at least one epoxidized polyisoprene having a molar degree of epoxidation ranging from 5% to 85%;
   at least one thermoplastic polyurethane; and
   a crosslinking system,
   wherein the at least one thermoplastic polyurethane comprises at least one flexible segment and at least one rigid segment, the flexible segment resulting from a reaction of a polyisocyanate with a polyol, the molecular weight of the hydrocarbon-based chain of which is between 600 and 2500 g/mol, and the rigid segment resulting from a reaction of a polyisocyanate with a diol or triol, the molecular weight of which is in a range extending from 40 to 350 g/mol.

2. The tire according to claim 1, wherein the at least one epoxidized polyisoprene predominantly comprises an epoxidized natural rubber.

3. The tire according to claim 1, wherein the molar degree of epoxidation of the at least one epoxidized polyisoprene is within a range extending from 10% to less than 50%.

4. The tire according to claim 1, wherein the molar degree of epoxidation of the at least one epoxidized polyisoprene is within a range extending from 40% to 80%.

5. The tire according to claim 1, wherein the at least one epoxidized polyisoprene has a Mooney viscosity (ML 1+4) at 100° C., measured according to Standard ASTM D1646 (1999), within a range extending from 30 to 150.

6. The tire according to claim 1, wherein a content of the at least one epoxidized polyisoprene, in the rubber composition, is within a range extending from 20 to 90 parts by weight per hundred parts by weight of elastomer, phr.

7. The tire according to claim 1, wherein a content of the at least one thermoplastic polyurethane, in the rubber composition, is within a range extending from 10 to 80 phr.

8. The tire according to claim 1, wherein the rubber composition comprises from 5 to 150 phr of at least one reinforcing filler.

9. The tire according to claim 1, wherein the rubber composition does not comprise a reinforcing filler or comprises less than 5 phr of a reinforcing filler.

10. The tire according to claim 8, wherein the at least one reinforcing filler comprises carbon black, a reinforcing inorganic filler or a mixture thereof.

11. The tire according to claim 8, wherein the at least one reinforcing filler predominantly comprises carbon black.

12. The tire according to claim 1, wherein the crosslinking system is based on molecular sulfur, a sulfur-donating agent, or both molecular sulfur and a sulfur-donating agent.

13. The tire according to claim 1, wherein the rubber composition is present in a tread of the tire.

14. The tire according to claim 1, wherein the tire is a tire for civil engineering, agricultural or heavy-duty vehicles.

15. A tire comprising a rubber composition based on:
- at least one epoxidized polyisoprene having a molar degree of epoxidation ranging from 5% to 85%;
- at least one thermoplastic polyurethane; and
- a crosslinking system,
- wherein the rubber composition does not comprise a reinforcing filler or comprises less than 5 phr of a reinforcing filler.

* * * * *